G. WILCOX.
QUICK ACTION TAILSTOCK.
APPLICATION FILED MAR. 1, 1920.

1,373,158.

Patented Mar. 29, 1921.
2 SHEETS—SHEET 1.

INVENTOR
George Wilcox

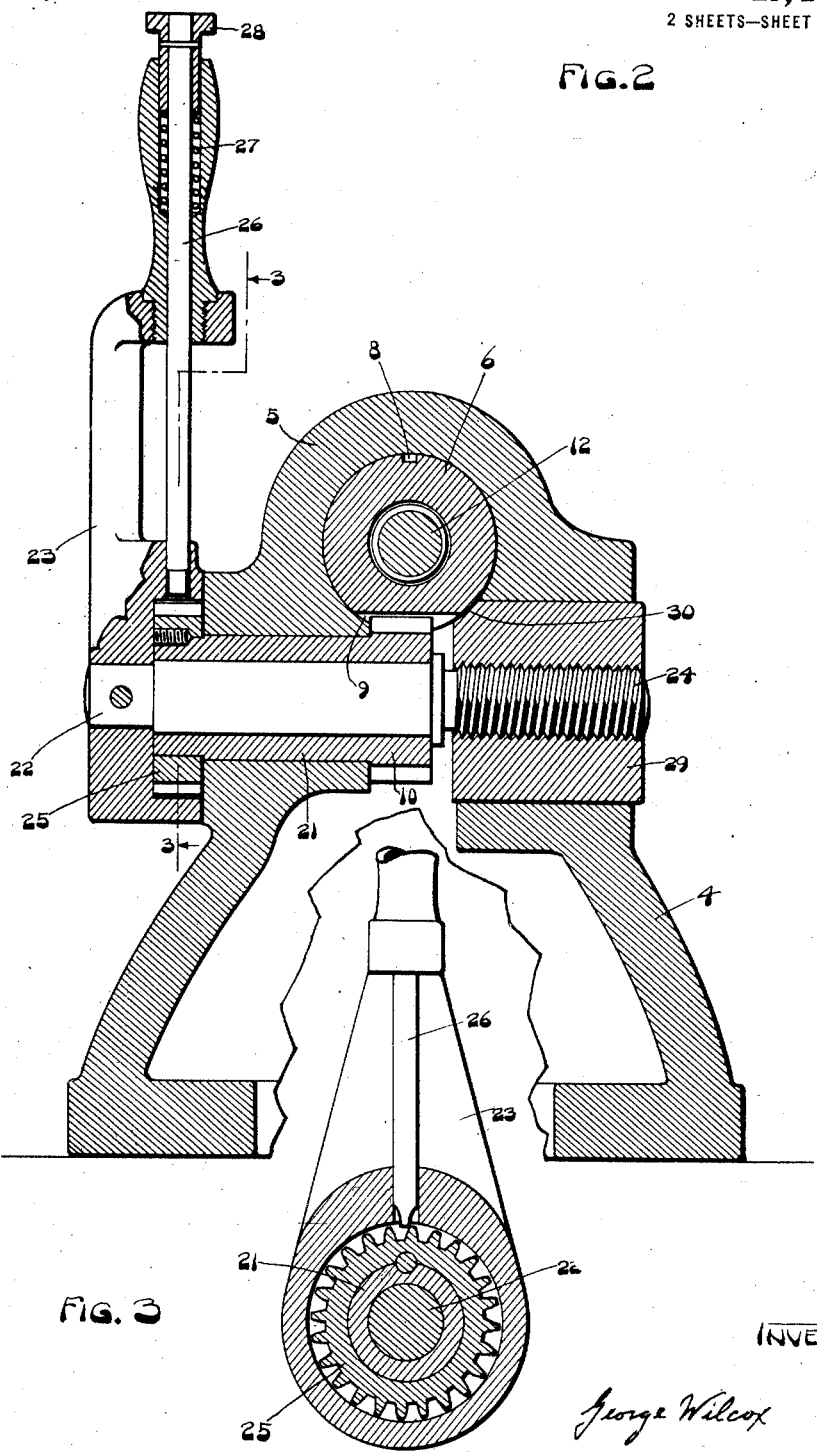

UNITED STATES PATENT OFFICE.

GEORGE WILCOX, OF CINCINNATI, OHIO.

QUICK-ACTION TAILSTOCK.

1,373,158.  Specification of Letters Patent.  Patented Mar. 29, 1921.

Application filed March 1, 1920. Serial No. 362,470.

*To all whom it may concern:*

Be it known that I, GEORGE WILCOX, a citizen of the United States, residing in Cincinnati, in the county of Hamilton and State of Ohio, have invented new and useful Improvements in Quick-Action Tailstocks, of which the following is a specification.

An object of my invention is to produce a tail stock in which the center may be brought rapidly to work-securing and work-releasing positions and as rapidly secured in such positions against displacement therefrom with an equally rapid release from secured position.

This and other objects are attained in the tail stock described in the following specification and illustrated in the accompanying drawings in which.

Fig. 2 is a transverse sectional elevation taken on the line 2—2 of Fig. 1.

Fig. 3 is a fragmental sectional elevation of a detail of my invention taken on the line 3—3 of Fig. 2.

Figure 1:
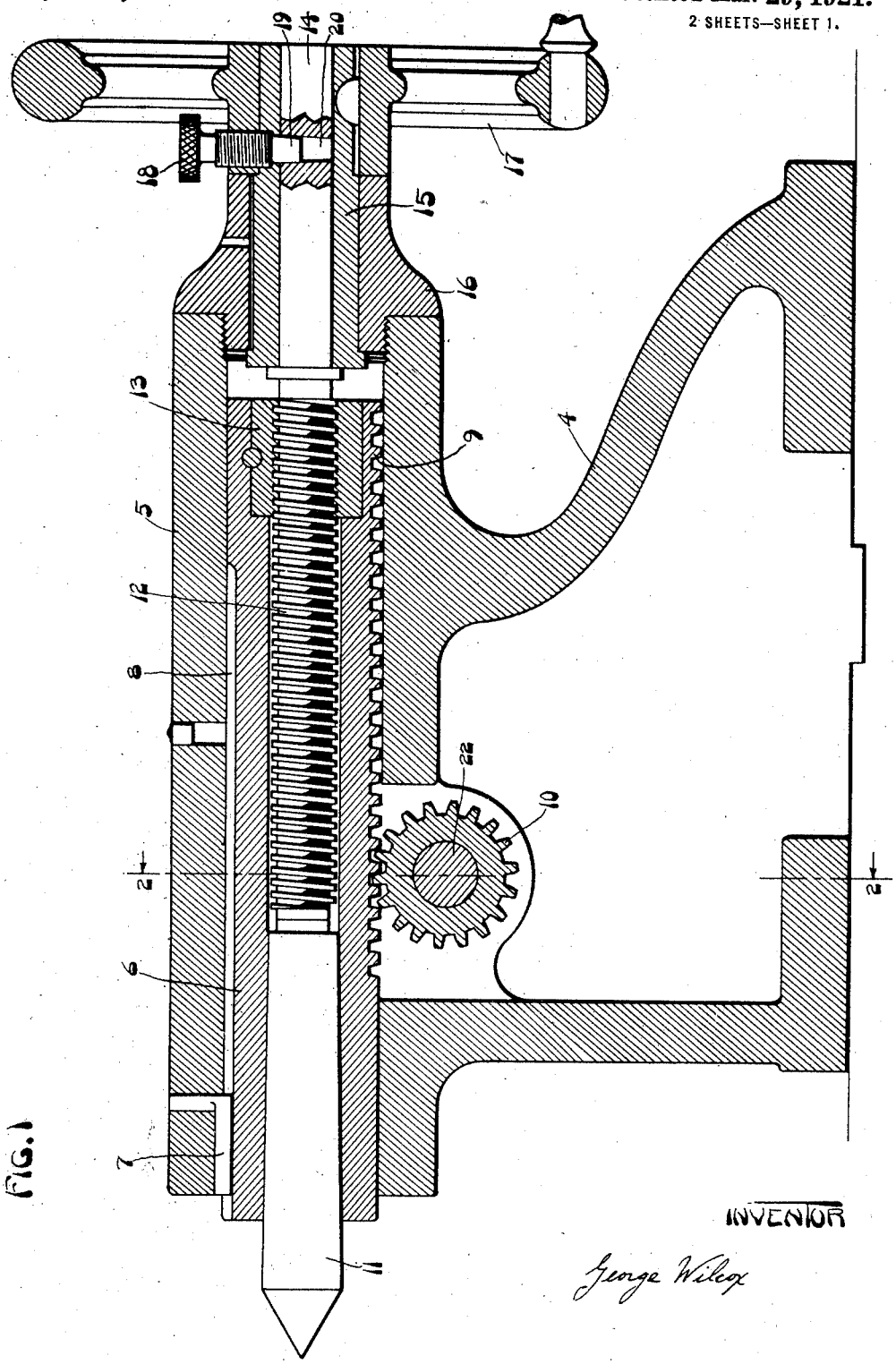
Figure 1 is a longitudinal sectional elevation of a tail stock embodying my invention.

The body 4 of the tail stock is provided with a hollow cylindrical portion 5 in which a spindle 6 is reciprocally mounted. A key 7 which occupies a groove 8, prevents rotation of the spindle while permitting reciprocation thereof. On its under side the spindle is provided with a series of rack teeth 9 which in coöperation with a pinion 10 are caused to move the spindle backward and forward thereby.

Located within the spindle is the center 11 and back of the center is a feed screw 12, the end of which occupies a nut 13 which is secured to the spindle and by means of which the spindle is caused to reciprocate upon rotation of the feed screw.

The rear end of screw 12 is provided with a shaft-like extension 14 which occupies a bushing or sleeve 15 which is rotatively mounted in a cap 16 secured to the rear end of portion 5 of the tail stock body.

The rear end of sleeve 15 is provided with a hand wheel 17 which is keyed thereto as shown. A thumb screw 18 is provided in sleeve 15 and hand wheel 17 for connecting them with extension 14, end 19 of the screw entering a hole 20 in the shaft for this purpose.

Pinion 10 is formed on the inner end of a sleeve 21 which is rotatively mounted on a transversely extending shaft 22 to one end of which a handle 23 is secured and upon the opposite end of which screw threads 24 are provided. On the outer end of sleeve 21 a ratchet wheel 25 is keyed and reciprocally mounted within the handle a ratchet bar 26 is held from engagement with the ratchet wheel teeth by a spring 27 a push pin 28 being provided for bringing its ends into engagement with the teeth of the ratchet wheel. The screw threads 24 enter a clamping wedge 29 for bringing its beveled edge 30 into clamping engagement with the spindle as will now be described.

In order to bring the center 11 quickly into position to hold the work between the centers of the lathe, it is but necessary to unscrew thumb screw 18 until end 19 thereof has cleared shaft 14. Handle 23 is then operated in a forward and backward direction, the bar 26 being pushed to bring its end into engagement with the teeth of ratchet 25 upon each forward movement and released to release the ratchet upon each backward movement. This causes pinion 10 to move spindle 6 forward rapidly, shaft 14 sliding within sleeve 15.

Backward or withdrawing movement of the spindle is caused by bringing bar 26 into engagement with the teeth of ratchet 25 upon backward movement of the handle and releasing the bar therefrom upon forward movement of the handle.

In order to lock the spindle in either its forward or retracted position, it is but necessary to release the ratchet after the desired position has been reached and then move the handle onward toward the work in the lathe, until wedge 29 has been brought into clamping engagement with the spindle.

Should it be desired to use hand wheel 17, the thumb screw is brought to lock the shaft 14 thereto and the wedge 29 is released. Rotation of the hand wheel will then rotate screw 12 and cause spindle 6 to be slowly reciprocated by reason of its coöperation with nut 13 which is secured to spindle 6.

Having thus described my invention what I claim is:

A quick action tail stock consisting of a hollow cylindrical portion, a spindle reciprocally mounted in the cylindrical portion and having rack teeth thereon, a pinion having the teeth thereof in engagement with the rack teeth, a wedge, a ratchet connected with the pinion, a handle operatively connected with the wedge, and manually operable means on the handle for causing operative connection and disconnection of the ratchet and handle.

In witness whereof I affix my signature in the presence of two witnesses.

GEORGE WILCOX.

Witnesses:
JOSEPH A. SULLIVAN,
WILLIAM TODD.